United States Patent
Yoshida

(10) Patent No.: US 7,414,750 B2
(45) Date of Patent: Aug. 19, 2008

(54) IMAGE READING APPARATUS, IMAGE PROCESSING APPARATUS, IMAGE READING METHOD, AND COMPUTER PRODUCT

(75) Inventor: Tomoyuki Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1055 days.

(21) Appl. No.: 10/086,897

(22) Filed: Mar. 4, 2002

(65) Prior Publication Data
US 2002/0122209 A1 Sep. 5, 2002

(30) Foreign Application Priority Data

| Mar. 2, 2001 | (JP) | ............................. 2001-057871 |
| Jul. 17, 2001 | (JP) | ............................. 2001-216549 |
| Mar. 1, 2002 | (JP) | ............................. 2002-055324 |

(51) Int. Cl.
*G06K 15/00* (2006.01)
*G06K 9/00* (2006.01)
*H04N 1/40* (2006.01)
*G03F 3/08* (2006.01)
*G09G 5/00* (2006.01)

(52) U.S. Cl. .......................... 358/1.9; 358/2.1; 358/504; 358/518; 345/581; 382/162; 382/167

(58) Field of Classification Search .................. 358/1.9, 358/520, 504, 527, 530, 485, 3.23, 3.02, 358/447, 463, 474, 475, 1.2, 3.2, 406, 494, 358/471, 482, 461, 1.14, 405, 448, 523, 2.1, 358/518; 399/81, 158, 207; 345/418, 581, 345/838; 382/112, 414, 254, 184, 274, 162, 382/167

See application file for complete search history.

(56) References Cited

U.S. PATENT DOCUMENTS

| 4,827,351 | A | * | 5/1989 | Sakamoto | .................... 358/447 |
| 5,218,671 | A | | 6/1993 | Liao et al. | |
| 5,241,347 | A | * | 8/1993 | Kodama | ..................... 399/49 |
| 5,448,381 | A | | 9/1995 | Bohan et al. | |
| 5,535,021 | A | * | 7/1996 | Chiang et al. | ............... 358/474 |

(Continued)

FOREIGN PATENT DOCUMENTS

| JP | 63-185279 | 7/1988 |
| JP | 1-31039 | 2/1989 |
| JP | 7-5040 | 1/1995 |

OTHER PUBLICATIONS

U.S. Appl. No. 10/086,897, filed Mar. 4, 2002, Yoshida.

(Continued)

*Primary Examiner*—Mark Zimmerman
*Assistant Examiner*—Charlotte M Baker
(74) *Attorney, Agent, or Firm*—Oblon, Spivak, McClelland, Maier & Neustadt, P.C.

(57) ABSTRACT

In the image reading apparatus, reference color patches used to determine the necessity of calibration are read, and the read image for the reference color patches is stored. The read image is converted using a color conversion function from data for a device-dependent RGB space to sRGB data for a standard color space to obtain sRGB reference image data. The converted read image and the sRGB reference image are displayed on a CRT. An operator compares the two images and performs an entry operation for executing calibration if the amount of displacement between the two is significant.

28 Claims, 7 Drawing Sheets

U.S. PATENT DOCUMENTS

| | | | |
|---|---|---|---|
| 5,809,366 A | 9/1998 | Yamakawa et al. | |
| 6,263,117 B1 * | 7/2001 | Lee | 382/254 |
| 6,421,146 B1 * | 7/2002 | Yoo | 358/461 |
| 6,618,170 B1 * | 9/2003 | Whiting et al. | 358/1.9 |
| 6,624,912 B1 * | 9/2003 | Kim | 358/3.23 |
| 6,658,139 B1 * | 12/2003 | Cookingham et al. | 382/112 |
| 6,873,431 B1 * | 3/2005 | Kohler et al. | 358/1.9 |
| 2001/0048529 A1 * | 12/2001 | Fotland | 358/1.9 |

OTHER PUBLICATIONS

U.S. Appl. No. 10/663,804, filed Sep. 17, 2003, Togami et al.
U.S. Appl. No. 10/687,625, filed Oct. 20, 2003, Kawamoto et al.
U.S. Appl. No. 10/663,784, filed Sep. 17, 2003, Shirata et al.
U.S. Appl. No. 10/663,784, filed Sep. 17, 2003, Shirata et al.

* cited by examiner

FIG.9

| 128 | 128 | 128 | 128 | 128 | 128 | 128 | 128 | 128 | 128 | 128 |
|-----|-----|-----|-----|-----|-----|-----|-----|-----|-----|-----|
| 128 | 128 | 128 | 128 | 128 | 128 | 128 | 128 | 128 | 128 | 128 |
| 128 | 128 | 128 | 128 | 128 | 128 | 128 | 128 | 128 | 128 | 128 |
| 128 | 128 | 128 | 128 | 128 | 128 | 128 | 128 | 128 | 128 | 128 |
| 128 | 128 | 128 | 128 | 128 | 128 | 128 | 128 | 128 | 128 | 128 |
| 128 | 128 | 128 | 128 | 128 | 128 | 128 | 128 | 128 | 128 | 128 |

FIG.10

| 128 | 123 | 128 | 133 | 128 | 123 | 128 | 133 | 128 | 123 | 128 |
|-----|-----|-----|-----|-----|-----|-----|-----|-----|-----|-----|
| 128 | 133 | 128 | 123 | 128 | 133 | 128 | 123 | 128 | 133 | 128 |
| 128 | 123 | 128 | 133 | 128 | 123 | 128 | 133 | 128 | 123 | 128 |
| 128 | 133 | 128 | 123 | 128 | 133 | 128 | 123 | 128 | 133 | 128 |
| 128 | 123 | 128 | 133 | 128 | 123 | 128 | 133 | 128 | 123 | 128 |
| 128 | 133 | 128 | 123 | 128 | 133 | 128 | 123 | 128 | 133 | 128 |

FIG.11

| 128 | 127 | 125 | 131 | 126 | 128 | 123 | 130 | 126 | 127 | 128 |
|-----|-----|-----|-----|-----|-----|-----|-----|-----|-----|-----|
| 128 | 131 | 128 | 123 | 129 | 129 | 129 | 126 | 125 | 131 | 128 |
| 128 | 124 | 125 | 126 | 128 | 130 | 133 | 133 | 128 | 123 | 128 |
| 128 | 132 | 128 | 127 | 126 | 131 | 126 | 124 | 125 | 133 | 128 |
| 128 | 125 | 128 | 131 | 124 | 121 | 128 | 130 | 128 | 125 | 126 |
| 128 | 131 | 129 | 126 | 127 | 132 | 126 | 126 | 127 | 131 | 127 |

IMAGE READING APPARATUS, IMAGE PROCESSING APPARATUS, IMAGE READING METHOD, AND COMPUTER PRODUCT

FIELD OF THE INVENTION

The present invention relates to an image reading apparatus, an image processing apparatus, an image reading method, and a computer product. The image reading apparatus is provided in the image processing apparatus such as digital copiers, facsimile machines, electronic filing systems, or malfunction machines.

BACKGROUND OF THE INVENTION

Number of documents handled in offices is growing, and these growing numbers of documents should be managed efficiently. In order to efficiently manage these documents, the need of the electronic filing system, which converts paper documents to electronic image data using an image scanner, is growing.

Color documents handled in offices are also increasing. In accordance with such a situation, the image scanners used for electronic filing are also required to cope with color processing.

When color image data electronified by a color image scanner is used in an actual case, the color image data is output to any of different types of output devices, for example, a video monitor such as CRT, a color printer, or a printing machine. Under such situations, there is some problem such that output colors between different devices do not match even if the same data is used to output images from these devices. That is, there is a different color tone between a monitor display and a color print.

The difference between colors output from output devices is caused by a difference between color spaces expressed by the input/output devices including the scanner, because each input/output device has specific characteristics to express its own color space.

In order to solve the above-mentioned problem, a color management system using ICC profile has been introduced in recent years. This ICC profile is proposed by International Color Consortium (ICC). The ICC profile is so called "history" in which color space and characteristics of each input/output device are written. The color management system on a personal computer determines the characteristics of each input/output device using the ICC profile and performs transaction of color data with the input/output device. This color data has been subjected to color correction so that colors between two input/output devices are apparently the same for the human eye.

The image scanner as an input device uses the ICC profile specific to the scanner. Therefore, in the color management system using the ICC profile, a user is required to manage relative information among the stored color image data, the scanner used to scan the color image data, and the ICC profile used for the scanning, and to provide corresponding color image data when the data is reproduced. If the management is troublesome for the user, it is possible to embed the ICC profile in a header of color image data to be stored. In this case, however, the size of the image data is increased and there by efficiency of electronic filing is decreased.

The International Electrotechnical Commission proposed "sRGB" as a default red, green, blue (RGB) space that was standard for the Internet at IEC/WD6 1996-2-1. The sRGB is described in "Default RGB color space—sRGB" as color management in a multimedia system. This sRGB is a standard color space that is device-independent.

Since the sRGB is the device-independent color space, by converting image data output from a color image scanner to the sRGB, the color management system can handle the image data specific to the color image scanner as the sRGB that is the standard color space. Further, the user does not need to manage the relative information among the stored color image data, the scanner used for scanning the color image data, and the ICC profile used for the scanning. Thus, the operation becomes extremely efficient.

Color image scanners provided with a function of outputting an SRGB image as the standard color space have been increasing in recent years for the above reason. Most of such scanners have a color conversion function in order to output sRGB images. This function is used to convert scanned device-dependent RGB signals to device-independent sRGB signals.

As the color image scanner is been used, a document-illuminating lamp, for example, is being degraded over time and thereby color tone of output images is being changed. In such a case, calibration is generally performed to stabilize the color against a color change. Calibration is to always keep color constant by controlling a driver of the illumination lamp to correct light quantity by the quantity that has been reduced, or by adjusting parameters of the color conversion function.

The calibration of the color conversion function is implemented at an appropriate time when the color tone has changed and it is determined that this change is beyond an allowable level. However, it is difficult to accurately determine by the scanner whether the changed color is beyond the allowable level within a short time as a case where the human can do. In other words, the human eyes can sense even a slight difference between colors and determine the difference very quickly and accurately. It has been general to use a method of totalizing operating time of the scanner and illuminating time of the illumination lamp, and of implementing calibration when the operating time of the color scanner reaches a time more than a predetermined time based on the totalized time. Therefore, according to such a method, a timing at which the calibration should be implemented may be missed, processing has been executed while the color tone has been changed, and degraded data has sometimes been continuously output.

Conventionally, even the color image scanner provided with the function of outputting sRGB images has used such an ordinary method based on the operating time of the scanner. Therefore, it has been desired to provide a method of executing calibration of any devices, which output sRGB images, at more accurate timing.

SUMMARY OF THE INVENTION

It is an object of the present invention to provide an image reading apparatus such as a color image scanner provided with a unit that accurately determines timing of executing calibration of a color conversion function, i.e., conversion characteristics used for color conversion, and an image processing apparatus provided with the image reading apparatus, such as a digital copier, a facsimile, an electronic filing system, or a malfunction machine.

The digital image reading apparatus according to one aspect of this invention comprises a light source which emits light to which an image is exposed, a color image sensor which reads the image as a target to be read exposed to the light to obtain image signals and outputs the image signals, and a color converter which subjects the image signals to color conversion to obtain digital color image data and outputs the digital color image data. The digital image reading apparatus further comprises a storage unit which stores reference image data generated based on reference color patches, and a display unit which reproduces two images based on data obtained by reading the reference color patches by the color image sensor to obtain image data for the reference color patches and subjecting the image data to processing and on the reference image data stored in the storage unit, and displays the images so as to be contrasted with each other. The digital image reading apparatus further comprises an instruction unit which issues an instruction to execute calibration of conversion characteristics in the processing for the color conversion based on the images displayed on the display unit.

The image processing apparatus according to another aspect of this invention is provided with the image reading apparatus.

Other objects and features of this invention will become apparent from the following description with reference to the accompanying drawings.

BRIEF DESCRIPTION OF THE DRAWINGS

FIG. 9 is a diagram showing an example of reference sRGB data stored in a nonvolatile memory, FIG. 10 is a diagram showing an example of adding variations to reference sRGB data the same as that of FIG. 9, and FIG. 11 is a diagram showing an example of using scanned values of the color patches, in an initial state at the time of manufacture of the scanner, as reference sRGB data the same as that of FIG. 9.

DETAILED DESCRIPTIONS

Embodiments of this invention will be explained below with reference to the accompanying drawings.

Figure 1:
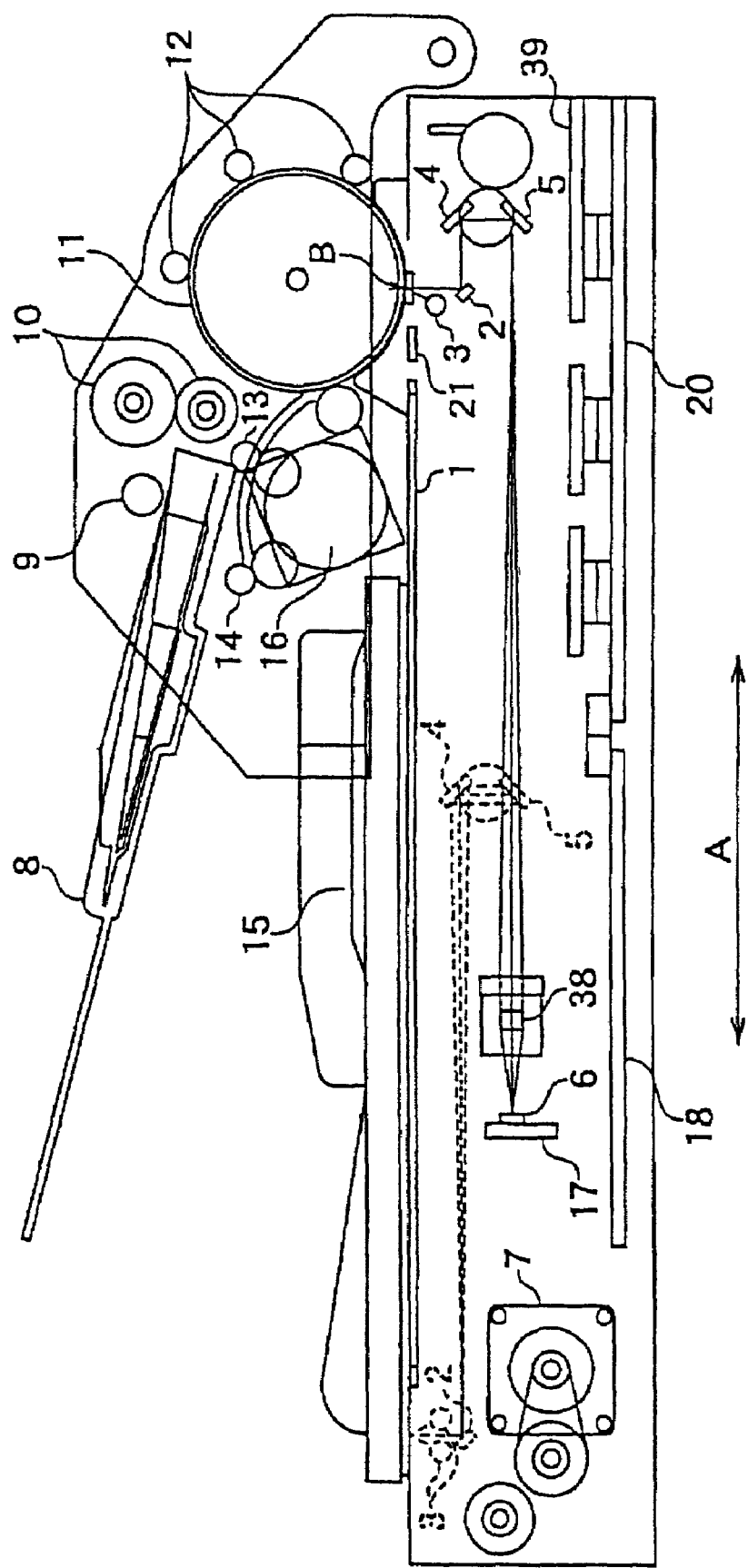
FIG. 1 is a diagram showing an overall configuration of the image reading apparatus according to this invention.

FIG. 1 is a diagram showing the overall configuration of the image reading apparatus according to this invention. The apparatus according to an embodiment shown in this figure operates in two scanning modes. The configuration related to one scanning mode (book scanning mode) that a document placed on a fixed position is scanned and its operation will be explained first. The document is placed on a glass 1 of the document base, is illuminated by an illumination lamp 3 integrally configured with a first mirror 2, and a light reflected on the document is transmitted by the first mirror 2, and integrally configured second mirror 4 and third mirror 5. The first mirror 2, the illumination lamp 3, the second mirror 4, and the third mirror 5 constitute a scanning optical system. This scanning optical system is movable in the direction A by a traveling-body motor 7 as a driving source. In FIG. 1, the state of the scanning optical system in the book scanning mode is indicated by a broken line. The scanning optical system keeps a predetermined optical path and focuses the reflected light from the document to a convergence optical system at a subsequent stage. The reflected light from the third mirror 5 is converged by a lens 38, and the converged light is irradiated to a CCD line image sensor ("CCD") 6 where the irradiated light is transferred photoelectrically.

It is noted that, in FIG. 1, the reference numeral 17 represents a board for image input with the built-in CCD 6, 18 represents a board for processing circuits, 20 represents a board for an interface, and 39 represents the interface.

The configuration of a mode in which a conveyed document is scanned (automatic document feeder (ADF) mode) and the operation of the ADF mode will be explained below. Each of documents stacked in a document tray 8 is fed to a pair of discharge rollers 13, 14 through an image scanning position B by a pickup roller 9, a pair of regist rollers 10, a conveying drum 11, and conveying rollers 12, and is discharged onto a sheet discharge tray 15. While passing through the document scanning position B, the document is scanned by the scanning system stopped at the position. Specifically, the scanning system is moved in the book scanning mode, fixed at a predetermined position, and used for scanning at the position. The operation of scanning is performed in the same manner as the above-mentioned manner. That is, the document is illuminated by the illumination lamp 3, the light reflected by the document is converged by the lens 38 through the first mirror 2 and the integrally configured second mirror 4 and third mirror 5, the converged light is irradiated to the CCD 6 where the irradiated light is transferred photoelectrically. For performing the processing, the pickup roller 9 and the pair of regist rollers 10 are driven by a paper feed motor (not shown), while the conveying drum 11, the conveying rollers 12, and the pair of discharge rollers 13, 14 are driven by a conveying motor 16.

A white reference plate 21 is prepared for performing shading correction when scanned data for a document varies even if the document has uniform density. This variation may have some causes such as variations in illumination of the illumination lamp 3, deterioration of the illumination lamp 3 with time, or non-uniform sensitivity of the CCD 6 for each pixel. This shading correction is performed by an electric circuit (not shown) using a line memory as follows. Before the document is scanned, the electric circuit scans reflected light quantity of the white reference plate 21 line by line in the main scanning direction, and stores the scanned white reference data in the memory. The electric circuit then divides the data for the scanned document for each pixel by the corresponding white reference data stored pixel by pixel, at the time of scanning the document. Equipment is provided to use for scanning color patches. The color patches are used to perform calibration of the color conversion function (explained later), other than the shading correction, and are provided in a part of the white reference plate 21 (see FIG. 5).

Figure 2:
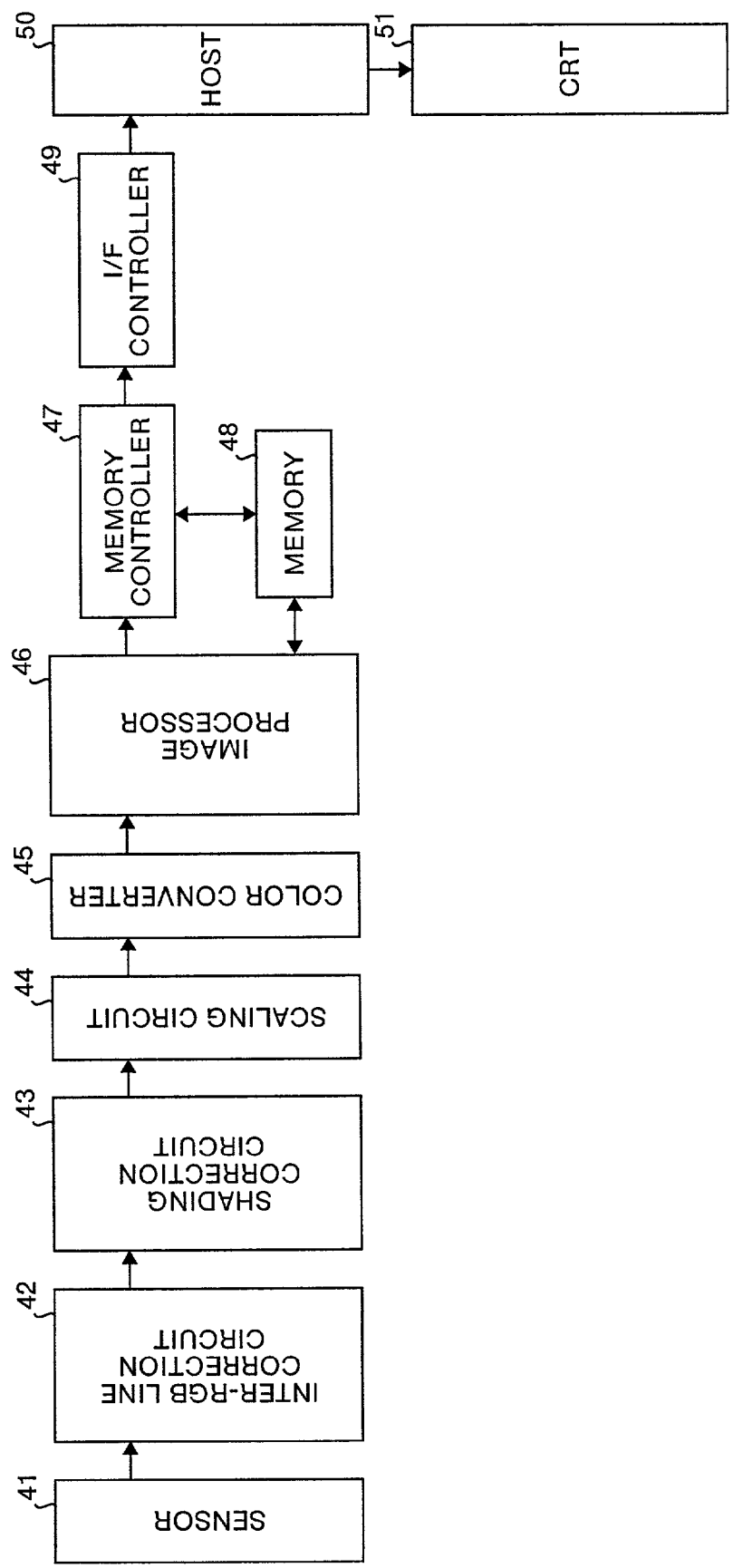
FIG. 2 is a block diagram showing video processing system according to the image reading apparatus.
Figure 3:
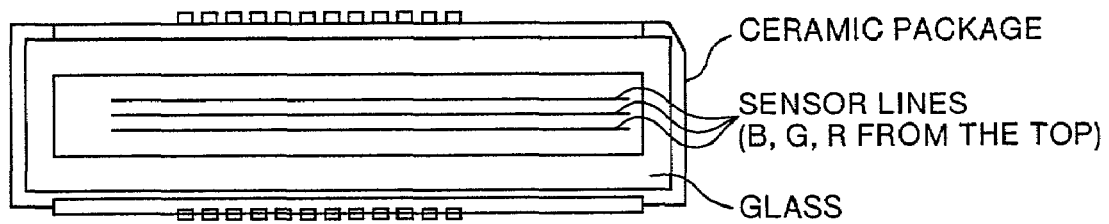
FIG. 3 is a diagram showing an example of an RGB line sensor used in the image reading apparatus.
Figure 4:
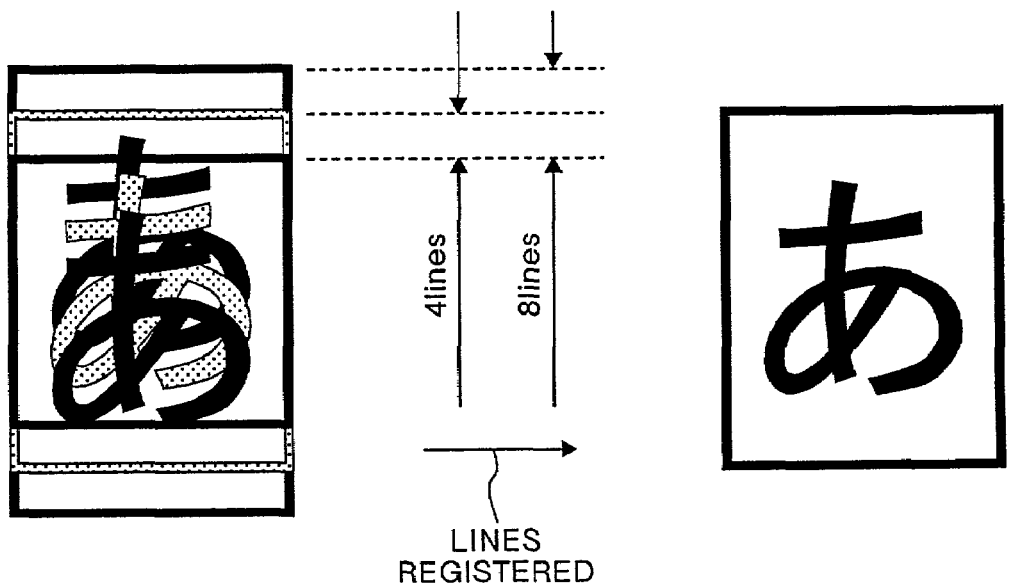
FIG. 4 shows how images are changed before and after positional displacements between RGB lines are corrected through interpolation computation.

FIG. 2 shows the block diagram of the video processing system according to the image reading apparatus of this invention. A sensor 41 (CCD 6 in FIG. 1) is an RGB line image sensor with color filters and CCD photoelectric conversion elements. The sensor 41 scans a document to obtain image data, converts the image data to RGB density signals, further converts each of the density signals to, for example, an 8-bit digital signal, and outputs the digital signal. The RGB scanning positions on the document during the operation are apart from each other by a physical space of each sensor for the RGB on the RGB line sensor 41. FIG. 3 shows an example of the RGB line sensor. An inter-RGB line correction circuit 42 corrects positional displacements between the RGB lines, occurring when each sensor outputs the signal, by the line memory and through interpolation computation, and registers remarked lines. FIG. 4 shows how the images are changed before and after the positional displacements are corrected through interpolation computation.

Variations in density for each RGB line are caused by nonuniform illumination or nonuniform sensitivity of the CCD for each pixel. A shading correction circuit 43 corrects the variations using the data for shading correction generated by scanning the white reference plate 21. A scaling circuit 44 performs scaling in the main scanning direction on the image data after being corrected. A color converter 45 performs color conversion based on preset table data. In this case, conversion is performed from scanned device-dependent RGB data (RGB data dependent on characteristics of each scanner) to sRGB data as one of standard color spaces. The parameters of color conversion described in the table data are changeable so that the parameters can be adjusted at the time of calibration.

An image processor 46 performs various types of image processing, such as modulation transfer function (MTF) correction, correction to video data such as smoothing set as required according to the purpose of its usage by each user, and processing for converting the number of gray scales such as dithering and error diffusion. A memory controller 47 stores video data, which has been subjected to image processing, in a memory 48, and controls the memory when the video data stored in the memory 48 is to be transferred to an external host computer (host) 50 (explained later) according to a request from an I/F controller 49. The memory 48 is an intermediate memory provided to accommodate a speed difference between a scanning speed and a video transferring speed, and is compact in size for cost-reduction measures. The stored data is readable by a CPU that controls the video processing system through the memory controller 47. The I/F controller 49 controls data transfer, such as arbitration of buses, according to any I/F for connection between the host 50 (explained later) and the scanner, and controls data for various settings such as data for mode settings transmitted or received to or from the host 50. In this embodiment, a SCSI I/F is used and a general-purpose SCSI controller is used for the I/F controller 49.

The host 50 and a CRT 51 are personal computers such as a co-called DOS/V machine. An operator of the color scanner can check the status of the image scanner (image reading apparatus) installed in the personal computer through application software, set various modes to implement a desired scanning operation, and load digital images output from the image scanner into the computer.

An embodiment of processing required for determination whether it is a right timing of performing calibration for color tone in the image reading apparatus will be explained below.

Figure 5:
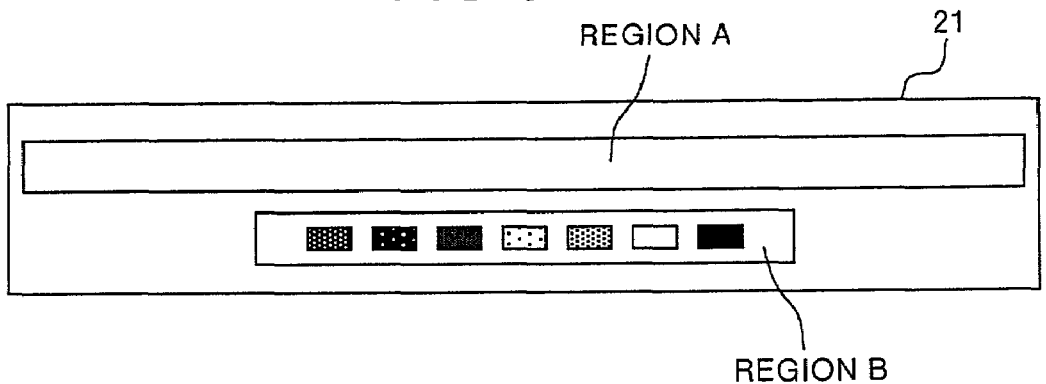
FIG. 5 shows an embodiment of a reference chart (color patches) used to determine timing at which calibration is executed.

FIG. 5 shows the reference chart used in this embodiment for determining whether it is a right timing of performing calibration. The reference chart is provided in a common member to the white reference plate 21 in this embodiment. As shown in this figure, the region A is a reference plane of the white plate used for shading correction. A color patch is provided in the region B. The color patch is provided with a plurality of color patches the same as those conventionally used. The color patches are scanned by the image scanner when the timing of executing calibration is determined in the sequence of processing according to the flow explained below. The color patches are not necessarily provided in the white reference plate 21, and may therefore be placed at some other position or may be formed as a discrete unit. Therefore, the operator may place the color patches at a data scanning position at the time of using them.

The color patches are measured by a spectro-colorimeter or the like to obtain XYZ values, and sRGB values calculated from the XYZ values are stored in a nonvolatile memory (not shown) disposed in the image scanner. It is noted that these sRGB values may be stored together with the application software (e.g., scanner-maintenance software including software for executing calibration) installed in the host 50 for utilizing the image scanner.

The processing for determining whether calibration is executed, performed on the application software instructed by the operator, and the operation of the image scanner will be explained below.

Figure 6:
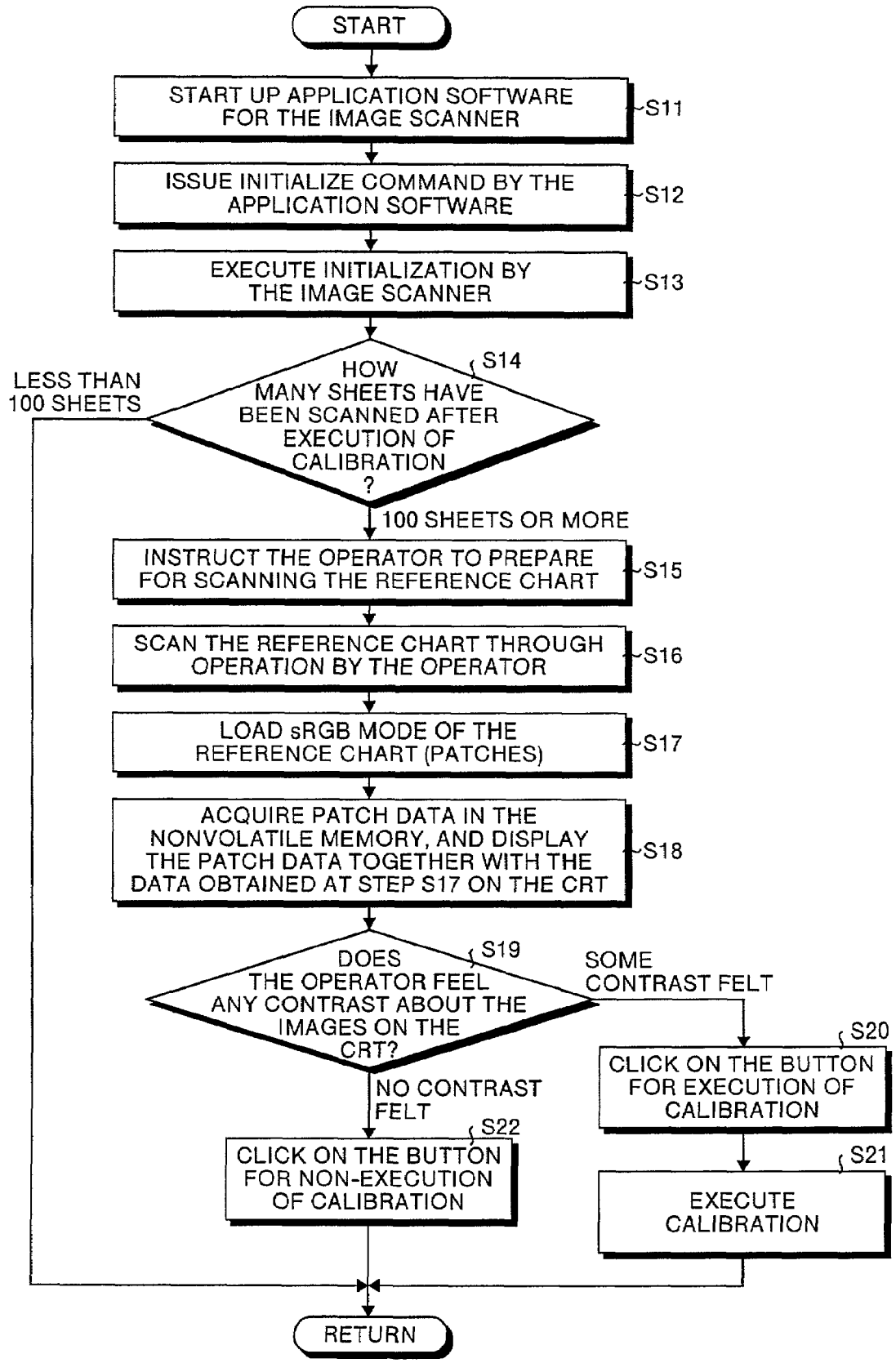
FIG. 6 shows a flow of an embodiment of the processing for determining whether calibration is executed and the operation of the image scanner.

FIG. 6 shows a flow chart of the processing and operation. This example is not the one shown in FIG. 5, in which the reference chart (color patches) is disposed in the white reference plate 21. But, the reference chart is formed as a discrete unit and is read by placing the chart at the scanning position when the operator uses it.

Referring to FIG. 6, the application software for calibration is started (S11) through an entry operation by the operator on the host 50 to use the image reading apparatus (image scanner). The application software issues an initialize command to the image scanner in order to check its initial state (S12).

The image scanner places its inside in the initial state according to the initialize command, and performs initialization on each unit (S13).

The image scanner checks whether a number of scanned sheets, which is a number of documents scanned after the previous calibration is executed, reaches more than a specified number (100 sheets here) (S14).

As a result of checking, if the number of scanned sheets does not reach 100 sheets, the image scanner determines that calibration does not need to be executed, ends the processing for determining execution of calibration, and returns to the initial state of the flow.

As a result of checking at step S14, on the other hand, if the number of scanned sheets reaches more than 100 sheets, the image scanner determines that the execution of calibration is highly required, and issues a request to start the processing for determining execution of calibration, to the application software.

When receiving the request from the image scanner, the application software issues an instruction to urge the operator to take some steps for scanning the reference chart (see FIG. 5) accompanying the image scanner (S15). This instruction is performed by means of a message urging to scan the reference chart shown on the screen through which the operator enters data.

The operator sets the reference chart in the image scanner and commands execution of scanning through key operation or the like according to the message (S16).

The image scanner scans the color patches on the reference chart by the color image sensor 41 according to the scanning instruction, performs respective processing on the scanned data for the color patches by the units of FIG. 2, outputs the processed color patch data to the host 50. The application software of the host 50 loads the received color patch data (S17). During the processing, the data read by the color image sensor 41 as data for an RGB space specific to the sensor is converted to data for an sRGB space as a standard space using the conversion table provided in the color converter 45, and the converted data is output to the host 50 as the data for the sRGB space.

The application software acquires the sRGB data stored in the nonvolatile memory of the image scanner, that is, the reference image data for the sRGB calculated based on the calorimetric data of the reference color patches. The application software then combines the reference image data with the sRGB data for the scanned image of the color patches obtained at step s17 in one screen, and displays both the data on the CRT, for example, so that two images can be contrasted with each other (S18).

Figure 7:
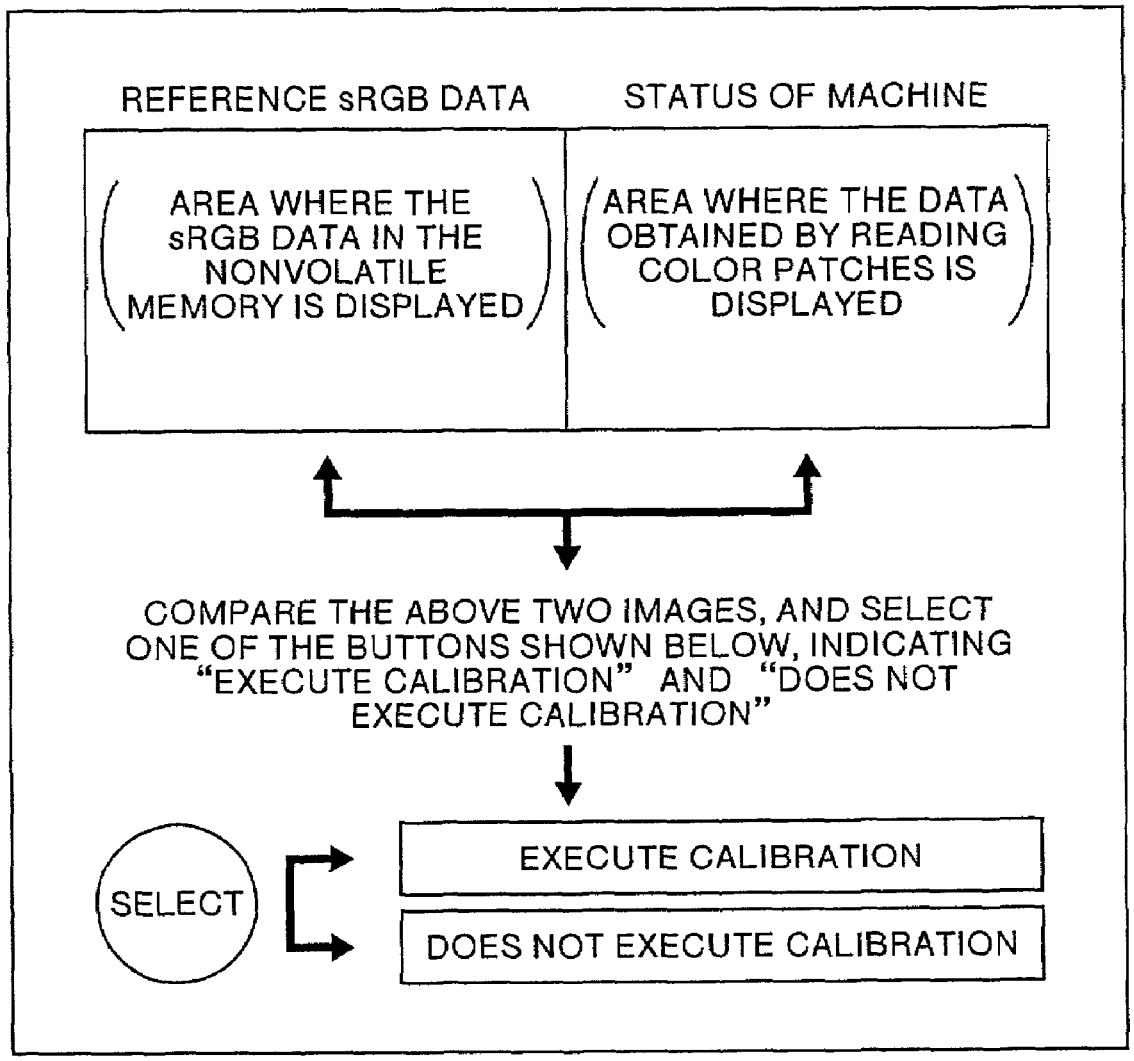
FIG. 7 is a conceptual diagram showing the screen on a CRT in order to contrast images with each other based on the data obtained by scanning the color patches and the data for the reference color patches.

FIG. 7 shows the conceptual diagram of the screen on the CRT when both images are displayed. As shown in this figure, the image based on the reference image data for the sRGB stored in the nonvolatile memory and the image based on the scanned sRGB data reflecting the status of the machine (scanning and processing conditions of the scanner), are displayed in one screen. Thereby, these images can be contrasted and determined what they are like. Furthermore, select buttons are provided on the screen so that the operator can select either execution or non-execution of calibration based on the result of the determination.

The operator compares the reference image of the color patches with the image that reflects the status of the machine on the CRT screen. If a contrast between the images is felt significant, the operator selects the button for execution of calibration according to the instruction of the message on the CRT screen. If no contrast is felt, the operator selects the button for non-execution of calibration (S19)

At step S19, if the contrast is felt significant as a result of contrast between the two images, the operator selects the button for execution of calibration (S20). The application software issues a calibration command to the image scanner in response to the selection by the operator. The image scanner receives the command and executes the operation of calibration (S21). The image scanner ends the processing of the flow after execution of the calibration, and returns to the initial state of the flow.

On the other hand, at step S19, if no contrast is felt, the operator selects the button for non-execution of calibration (S22). The image scanner ends the processing of determining whether calibration is executed without executing calibration in response to the selection by the operator, and returns to the initial state of the flow.

Another embodiment of the processing for determining whether calibration is executed, performed on the application software instructed by the operator, and of the operation of the image scanner will be explained below.

In the above-mentioned embodiments, an error may occur due to sporadic noise at the time of scanning when the color patches on the reference chart are scanned as an image that reflects the status of the machine to generate image data and the generated image data is used.

Figure 8:
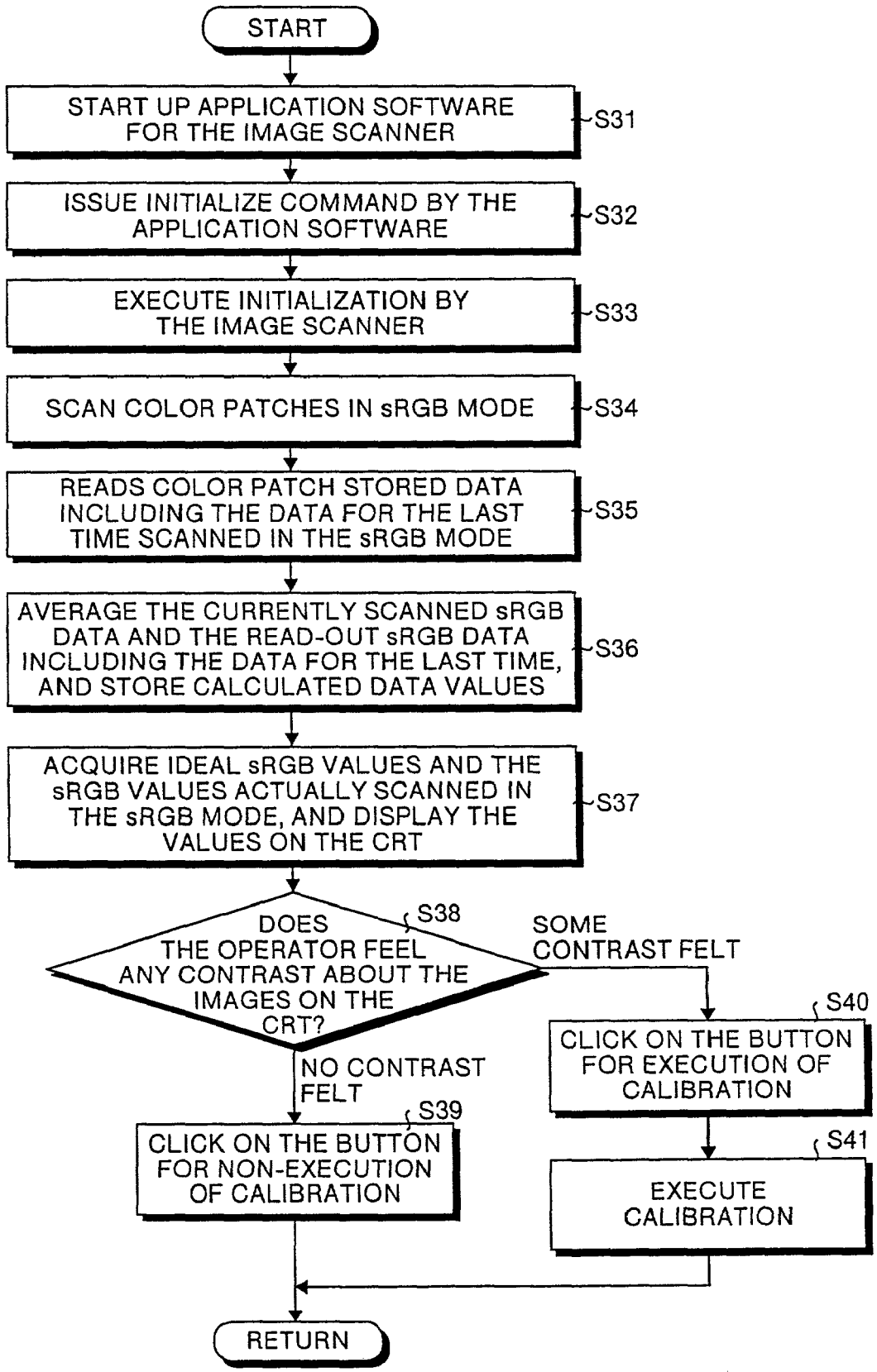
FIG. 8 shows a flow of another embodiment of the processing for determining whether calibration is executed and the operation of the image scanner.

Therefore, this embodiment is targeted to reduce such influence, and is provided with means to solve the problem, that is, a unit for performing averaging on sRGB data for the scanned image. FIG. 8 shows the flowchart of the processing for averaging and operation of the unit. In the example of this figure, the processing is executed based on the example of FIG. 5, in which the reference chart (color patches) to be scanned is provided in the white reference plate 21. In other words, the processing is automatically executed.

Referring to FIG. 8, the application software for calibration is started (S31) through an entry operation by the operator on the host 50 to use the image reading apparatus (image scanner). The application software issues an initialize command to the image scanner in order to check its initial state (S32).

The image scanner places its inside in the initial state according to the initialize command, and performs initialization on each unit (S33). The image scanner then scans the color patches in the region B of FIG. 5 in sRGB mode (S34).

The CPU as a controller of the image scanner reads out the sRGB data obtained when the color patches in the region B have been previously scanned and stored in the nonvolatile memory, while scanning the color patches in the region B at step S34 (S35). The CPU performs averaging (to obtain a weighted average) of the currently scanned sRGB data and the previously stored sRGB data fetched from the nonvolatile memory, and stores the averaged value in the nonvolatile memory (S36). By obtaining the weighted average of the data, it is possible to reduce the influence on scanning the data due to sporadic error occurring caused by noise or the like, or to grasp deterioration of the machine over time. It is also possible to accomplish an intended purpose with a further smaller capacity of memory by storing only the averaged sRGB data or by updating the averaged data with the latest averaged data, so that only the latest averaged data is stored.

The image scanner scans and averages data for the color patches, and outputs the data to the host 50. The host 50 receives and loads the data by the application software. The application software acquires the sRGB data stored in the nonvolatile memory of the image scanner, that is, the reference image data for the sRGB calculated based on the calorimetric data for the reference color patches. The application software then combines the reference image data with the scanned data for the color patches in one screen and displays both the data on the CRT, for example, so that images based on the data can be contrasted with each other (S37)

As a display of the images on the screen of the CRT is the same as that of the previously explained embodiment (see FIG. 7), explanation of the display is omitted.

The operator compares the reference image of the color patches with the image that reflects the status of the machine on the CRT screen. If a contrast between the images is felt significant, the operator selects the button for execution of calibration according to the instruction of the message on the CRT screen. If no contrast is felt, the operator selects the button for non-execution of calibration (S38).

At step S38, if no contrast is felt, the operator selects the button for non-execution of calibration (S39) The image scanner ends the processing for determining whether calibration is executed without executing calibration in response to the selection by the operator, and returns to the initial state of the flow.

On the other hand, at step S38, if the contrast is felt significant as a result of contrast between the two images, the operator selects the button for execution of calibration (S40). The application software issues a calibration command to the image scanner in response to the selection by the operator. The image scanner receives the command and executes the operation of calibration (S41) The image scanner ends the processing of the flow after execution of the calibration, and returns to the initial state of the flow.

An embodiment of the reference color patches used to determine whether calibration is executed will be explained below.

When the reference color patches are uniform in density, in other words, any nonuniform portion is not found in the color patches, constant sRGB values are obtained from XYZ values obtained by measuring respective colors of the color patches with the spectro-colorimeter or the like. That is, the data for one of the color patches becomes uniform as "128" as shown in FIG. 9. Specifically, this data is displayed in the area for the image based on the reference sRGB data stored in the nonvolatile memory, on the screen in FIG. 7. FIG. 9 shows R data of the sRGB data.

In this embodiment, the reference sRGB values are values with a variation of ±5 added to sRGB values calculated from XYZ values measured by the spectro-colorimeter or the like. That is, these values with the variations are then stored in the nonvolatile memory as the data for color patches. FIG. 10 shows an example of the sRGB values with a variation of ±5. One of reasons of allowing the values to have such variations is that even reference color patches requiring uniformity are prepared as a chart in an actual case and each of product lots with which the chart is prepared includes a certain degree of variations. Another reason is that device-dependent sRGB data is scanned by the scanner using the color patches prepared in such a manner, and therefore, by adding the variations to the sRGB values stored in the nonvolatile memory used to be contrasted, the operator can determine more accurately the contrast between the images.

This embodiment relates to the reference sRGB data stored in the nonvolatile memory, and is therefore applicable to any of the embodiments as shown in FIG. 6 and FIG. 8.

Another embodiment of the reference color patches used for determining whether calibration is executed will be explained below.

In this embodiment, the reference sRGB values to be stored in the nonvolatile memory are values obtained by scanning color patches of the reference chart mounted or packaged in an image scanner at the time of its shipping. That is, the scanned values of the color patches in the initial state at the time of manufacture of the scanner are stored in the nonvolatile memory as the references RGB values. FIG. 11 shows an example of the sRGB values scanned in such an initial state of the scanner.

One of reasons of allowing the values to have such variations is that even reference color patches requiring uniformity are prepared as a chart in an actual case and each of product lots with which the chart is prepared includes a certain degree of variations. Another reason is that device-dependent SRGB data scanned by the scanner is obtained using the color patches prepared in such a manner, and therefore, by adding the variations to the sRGB values stored in the nonvolatile memory used to be contrasted, the operator can accurately recognize deterioration of the machine over time, which makes it possible for the operator to more accurately determine the contrast between two images.

An existing image processing device such as copiers, printers, facsimiles, or plotters is provided with an image reading unit as an input unit for image data to be processed. This image reading unit subjects an image signal from a color image sensor to processing including color conversion.

The image processing apparatus of this invention is possible to be put to use by replacing the image reading unit of the existing image processing device with the image reading apparatus explained in the embodiments, or by applying the image reading apparatus to the image reading unit.

According to one aspect of this invention, it is possible to provide the image reading apparatus capable of determining whether calibration should be executed, with stability, accuracy, and comparatively low cost, and of always outputting stably scanned data through the processing as follows. That is, in order to determine whether calibration is required, the reference color patches are scanned by the color image sensor, and the scanned image is subjected to color conversion. Images are reproduced based on both data for the scanned image and the reference image generated based on the reference color patches stored in the storage unit. The two images are displayed on the screen so as to be contrasted with each other, and the operator compares the two images. If it is determined that the amount of displacement between the two is large, calibration for color conversion characteristics is executed.

Furthermore, it is possible to reduce error due to noise that may occur sporadically during scanning of the color patches and to output a stabilized accurate image by averaging the image obtained through scanning of the reference color patches on a time-varying basis and using the averaged image as one of images to be contrasted in order to determine the necessity of calibration. Thereby, it is possible for the operator to appropriately determine whether calibration is required. Further, it is possible to reduce the amount of data to be stored in the memory and simplify the processing by storing previous data to be used for averaging processing not in the original form of the scanned data but in the form of the averaged image that has been used.

Moreover, it is possible to easily determine the necessity of calibration by providing reference image data with the data for the standard color space such as sRGB data. This calibration is appropriately performed by the image reading apparatus provided with the unit for converting the RGB space that is specific to the color image sensor, to the standard color space, in place of the unit for performing the processing on a scanned image.

Furthermore, it is possible to more appropriately determine the necessity of calibration by creating the reference image data based on the calorimetric values obtained by actually measuring the reference color patches with a measuring device. It is also possible to further accurately determine how two images are displaced on the screen by accommodating variations in the color patches of the reference chart used to obtain device-dependent data, through addition of variations to the calorimetric values of the reference color patches to obtain the data with variations as the reference image data.

Moreover, it is possible to determine how device-dependent data is deteriorated as the time elapses and it is thereby possible to more accurately determine how two images are displaced on the screen by providing the reference image data with data as follows. That is, this data is obtained by scanning the reference color patches in the initial state of the digital image reading apparatus at the time of its manufacture by the color image sensor to obtain image data for the reference color patches, and by performing processing on the image data.

According to another aspect of this invention, it is possible to improve performance of the image processing apparatus by realizing the above-mentioned effects in the image processing apparatus provided with the image reading apparatus, such as a digital copier, a facsimile, an electronic filing system, or a multifunction machine.

The present document incorporates by reference the entire contents of Japanese priority documents, 2001-057871 filed in Japan on Mar. 2, 2001, 2001-216549 filed in Japan on Jul. 17, 2001 and 2002-055324 filed in Japan on Mar. 2, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image reading apparatus comprising:
   a storage unit which stores reference image data including
      color tones of the reference image data, generated based on image data for reference color patches taken from a reference scan of the reference color patches to provide stored image data of the reference color patches;

a display unit which reproduces two images, a first image based on processed image data taken from a comparison scan of the same reference color patches after a predetermined plurality of images have been scanned and a second image based on the reference image data stored in the storage unit containing the stored image data taken from the reference scan of the reference color patches, and which displays the two images so as to be contrasted with each other by said color tones, wherein the reference scan and the comparison scan are scans of the same reference color patches; and an instruction unit which issues an instruction to execute calibration of conversion characteristics in the processing for color conversion based on the two images displayed on the display unit.

2. The apparatus according to claim 1, further comprising an averaging unit which averages the read image data for the reference color patches, on a time varying basis, wherein the image data averaged by the averaging unit is used as the read image data for the reference color patches that is displayed on the display unit as one of the images to be contrasted.

3. The apparatus according to claim 2, further comprising a storage unit which stores the image data averaged by the averaging unit, wherein the averaging unit averages a currently read image data and the image data fetched from the storage unit.

4. The apparatus according to claim 1, wherein the color conversion is processing for converting an RGB space that is specific to the color image sensor, to a standard color space, and the reference image data stored in the storage unit is data for the standard color space.

5. The apparatus according to claim 1, wherein the reference image data is data based on colorimetric values of the reference color patches.

6. The apparatus according to claim 5, wherein the reference image data is based on data obtained by adding a predetermined variation to the colorimetric values of the reference color patches.

7. The apparatus according to claim 1, wherein the reference image data is based on data obtained by reading the reference color patches in an initial state at the time of manufacture of the image reading apparatus by the color image sensor to obtain image data for the reference color patches, and by performing color conversion on the image data.

8. The apparatus according to claim 1, wherein the reference color patches are disposed as a part of the apparatus.

9. The apparatus according to claim 1, wherein the reference color patches are supplied by a user to the apparatus.

10. An image processing apparatus provided with an image reading apparatus comprising:

a light source which emits light, to which an image is exposed;

a color image sensor which reads the image as a target to be read exposed to the light to obtain image signals, and outputs the image signals;

a color converter which subjects the image signals to color conversion to obtain digital color image data and outputs the digital color image data;

a storage unit which stores reference image data including color tones of the reference image data, generated based on reference color patches taken from a reference scan of the reference color patches to provide stored image data of the reference color patches;

a display unit which reproduces two images, a first image based on processed image data taken from a comparison scan of the same reference color patches by the color image sensor after a predetermined plurality of images have been scanned, and a second image based on the reference image data stored in the storage unit containing the stored image data taken from the reference scan of the reference color patches, and which displays the two images so as to be contrasted with each other by said color tones, wherein the reference scan and the comparison scan are scans of the same reference color patches; and an instruction unit which issues an instruction to execute calibration of conversion characteristics in the processing for color conversion based on the images displayed on the display unit.

11. The apparatus according to claim 10, wherein the reference color patches are disposed as a part of the apparatus.

12. The apparatus according to claim 10, wherein the reference color patches are supplied by a user to the apparatus.

13. An image reading method comprising the steps:

emitting light by a light source and exposing an image to the light;

reading the image as a target to be read exposed to the light by a color image sensor to obtain image signals and outputting the image signals;

color-converting the image signals to digital color image data and outputting the digital color image data;

storing reference image data including color tones of the reference image data, generated based on reference color patches taken from a comparison scan of the reference color patches to provide stored image data of the reference color patches taken after a predetermined plurality of images have been taken by the reading step;

reproducing two images, a first image based on data taken from a reference scan of the same reference color patches at a time of manufacture of an image reading apparatus by the color image sensor in the reading step to obtain image data for the reference color patches and by converting the image data in the color converting step and a second image based on the reference image data stored in the storing step containing the stored image data of the reference color patches taken from the comparison scan of the same reference color patches, and displaying the two images so as to be contrasted with each other by said color tones, wherein the reference scan and the comparison scan are scans of the same reference color patches; and issuing an instruction to execute calibration of conversion characteristics in the color converting step based on the images displayed in the displaying step.

14. The method according to claim 13, further comprising an averaging step of averaging the image data obtained by reading the reference color patches in the reading step, on a time varying basis, wherein the image data averaged in the averaging step is used as the read image data for the reference color patches that is displayed in the display step as one of the images to be contrasted.

15. The method according to claim 14, further comprising a storing step of storing the image data averaged in the averaging step, wherein in the averaging step, a currently read image and the image stored in the storing step are averaged.

16. The method according to claim 13, wherein the color converting step is a step of converting an RGB space that is specific to the color image sensor, to a standard color space, and the reference image data stored in the storing step is data for the standard color space.

17. The method according to claim 13, wherein the reference image data is data based on colorimetric values of the reference color patches.

18. The method according to claim 17, wherein the reference image data is based on data obtained by adding a predetermined variation to the colorimetric values of the reference color patches.

19. The method according to claim 13, wherein the reference image data is based on data obtained by reading the reference color patches in the initial state at the time of manufacture of the image reading apparatus by the color image sensor in the reading step to obtain image data for the reference color patches, and by converting the image data in the color converting step.

20. The method according to claim 13, wherein the storing reference image data scans said reference color patches disposed as a part of the image reading apparatus.

21. The method according to claim 13, wherein the storing reference image data scans said reference color patches supplied by a user to the image reading apparatus.

22. A computer readable medium encoded with a computer program which makes a computer execute the steps of:

reading reference color patches taken from a reference scan of the reference color patches by a color image sensor to obtain image data for the reference color patches;

performing processing on the image data for the reference color patches, and outputting the processed image data;

storing reference image data including color tones of the reference image data, generated based on the processed image data for the reference color patches to provide stored image data of the reference color patches;

reproducing two images, a first image based on processed image data from the test of taken from a comparison scan of the same reference color patches after a predetermined plurality of images have been scanned and a second image based on the reference image data stored in the storage step containing the stored image data of the reference color patches taken from the reference scan of the reference color patches, and displaying the two images so as to be contrasted with each other by said color tones, wherein the reference scan and the comparison scan are scans of the same reference color patches; and issuing an instruction to execute calibration of conversion characteristics in the processing for color conversion based on the images displayed in the displaying step.

23. The medium according to claim 22, further making the computer execute an averaging step of averaging the image data obtained by reading the reference color patches in the reading step, on a time varying basis, wherein the image data averaged in the averaging step is used as the read image for the reference color patches that is displayed in the display step as one of the images to be contrasted.

24. The medium according to claim 23, further making the computer execute a storing step of storing the image data averaged in the averaging step, wherein in the averaging step, a currently read image and the image stored in the storing step are averaged.

25. The medium according to claim 22, wherein the color converting step is a step of converting an RGB space that is specific to the color image sensor, to a standard color space, and the reference image data stored in the storing step is data for the standard color space.

26. The medium according to claim 22, wherein the reference image data is data based on colorimetric values of the reference color patches.

27. The medium according to claim 26, wherein the reference image data is based on data obtained by adding a predetermined variation to the colorimetric values of the reference color patches.

28. The medium according to claim 22, wherein the reference image data is based on data obtained by reading the reference color patches in the initial state at the time of manufacture of the image reading apparatus by the color image sensor in the reading step to obtain image data for the reference color patches, and by converting the image data in the color converting step.

* * * * *